June 16, 1959     E. ALLGAIER     2,890,597
DUAL CONTROL FOR AUTOMOBILES
Filed July 14, 1955     3 Sheets-Sheet 3
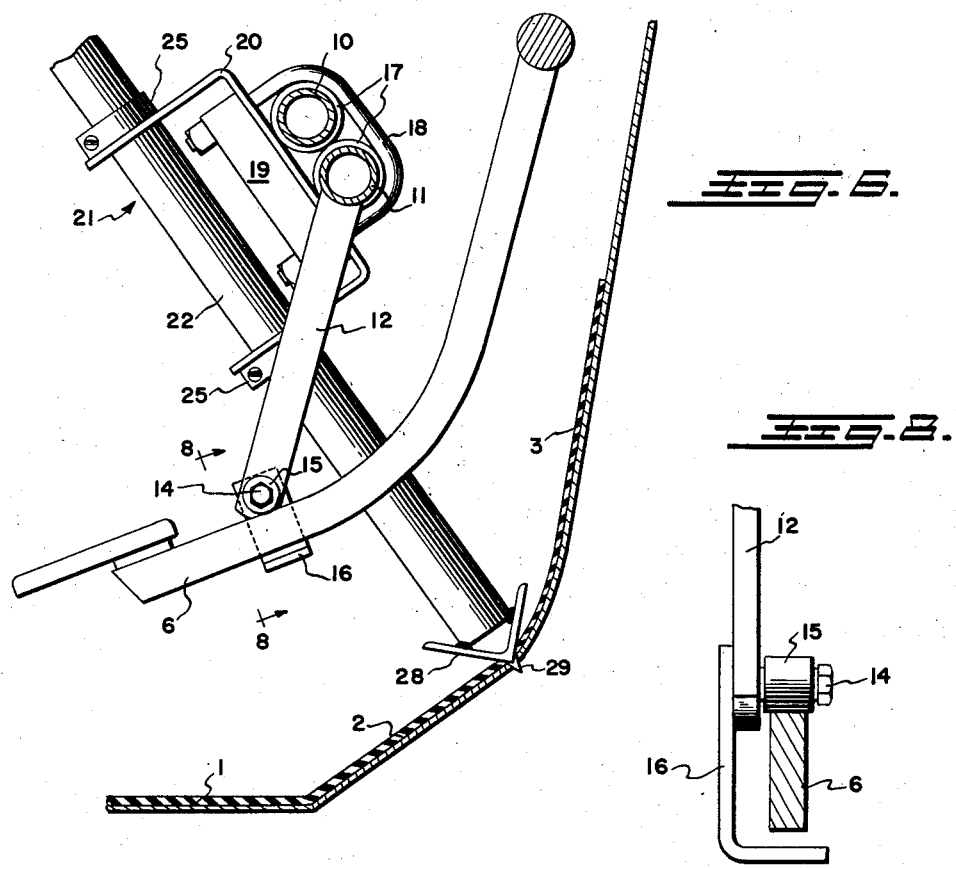
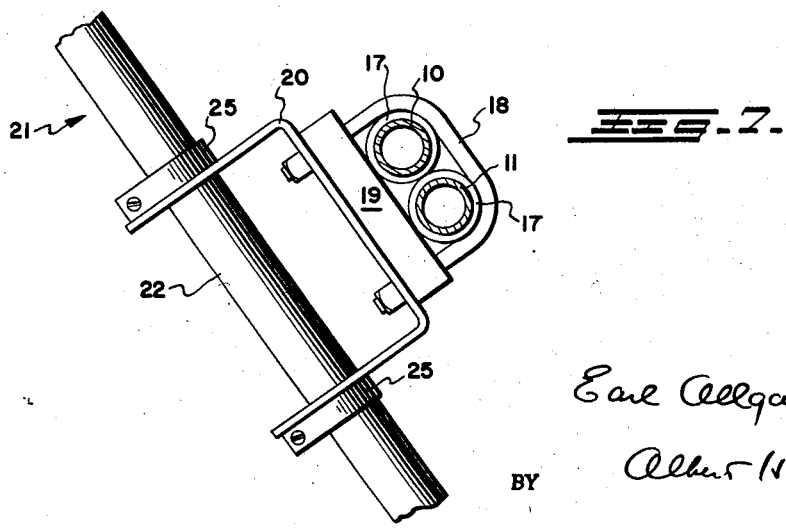
INVENTOR
Earl Allgaier
Albert N. Kirchner
BY
ATTORNEY

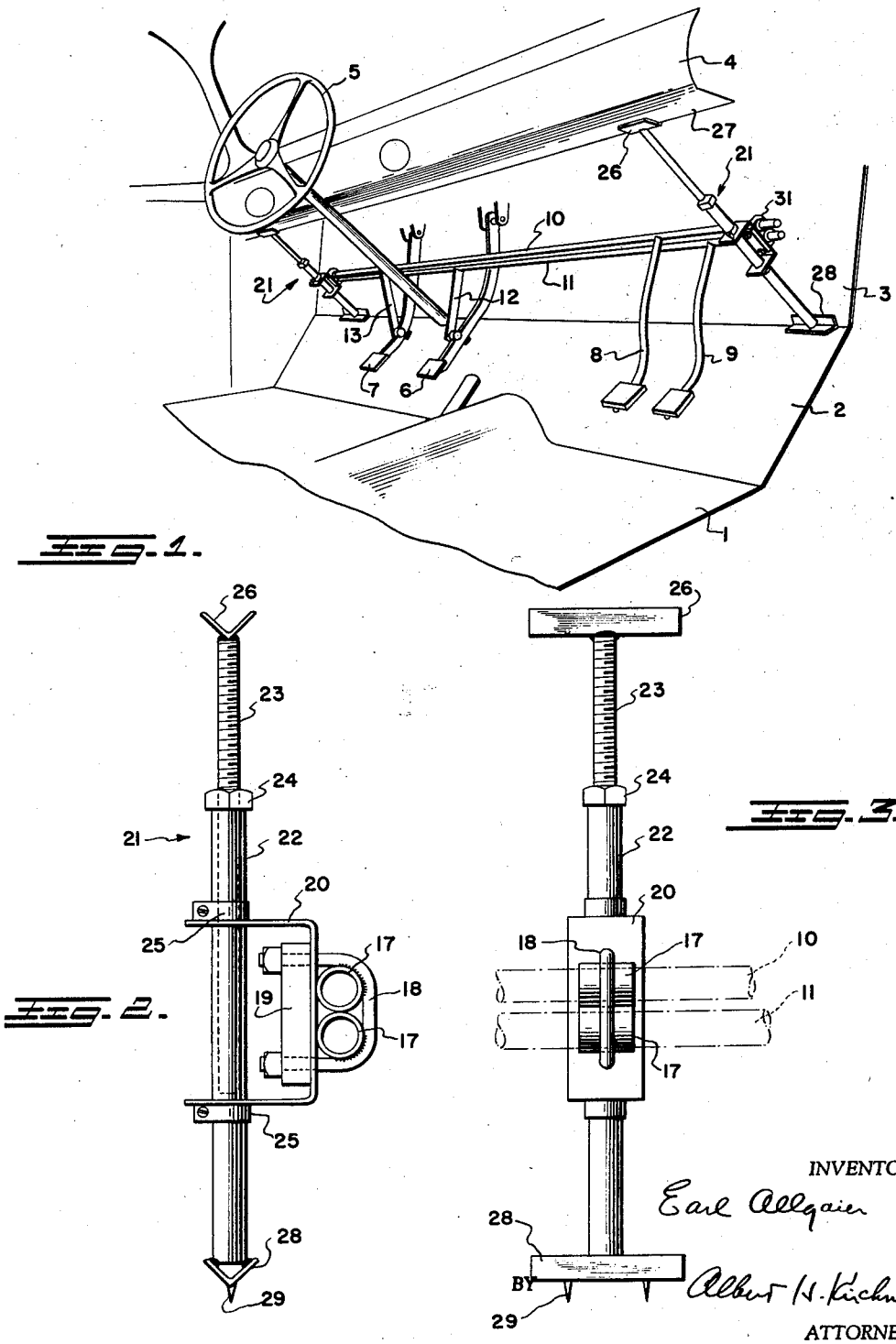

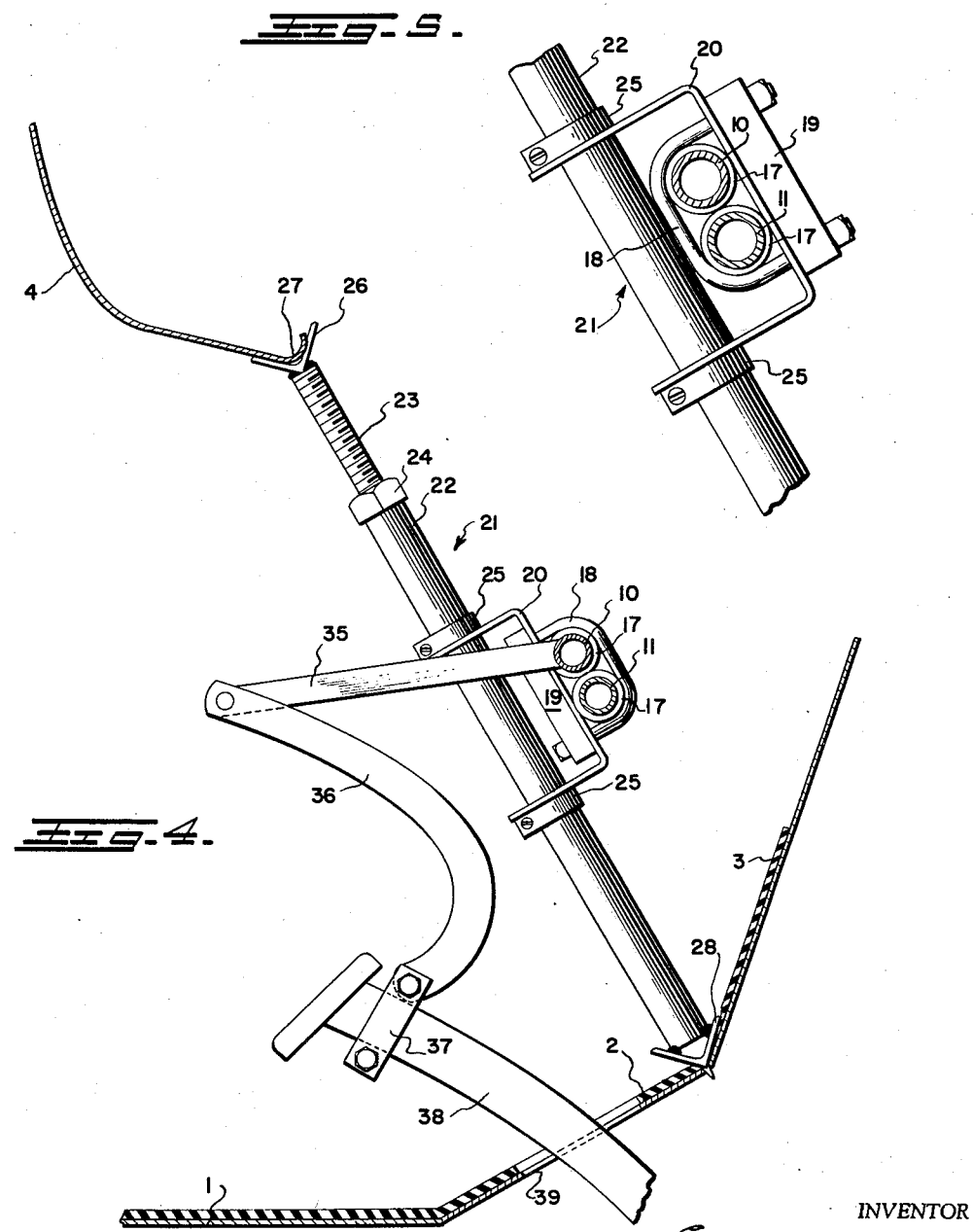

United States Patent Office 2,890,597
Patented June 16, 1959

2,890,597

DUAL CONTROL FOR AUTOMOBILES

Earl Allgaier, Arlington, Va.

Application July 14, 1955, Serial No. 522,107

8 Claims. (Cl. 74—562.5)

The present invention relates to dual control equipment for automotive vehicles, i.e., to those attachments which are installed in an automobile of conventional construction to supply additional actuating means for the control pedals, such as the clutch and brake pedals, which can be operated by an instructor occupying the front seat, alongside of a student driver occupying the normal driver's position on the front seat.

Apparatus of this general type is well known and in extensive use at the present time by automobile driving schools, public schools, motor associations and the like, and has been accorded wide acceptance as facilitating automobile driving instruction by putting the car at all times under the supervisory control of the instructor who, through the medium of the supplemental pedal or pedals provided by the attachment, is able to intervene and bring the car to a quick stop in the case of any emergency.

An objection to the best of the prior art dual control equipment with which I am acquainted is that it is, generally speaking, elaborate and cumbersome and requires fairly extensive modification of the existing automobile structure for its installation. This latter difficulty is not a particularly serious consideration when the equipment is to be permanently installed on an automobile that is continuously used by a driving school, but it substantially eliminates use of the equipment on a temporary basis, as by a parent, for example, who desires to instruct his son or daughter in the operation of the family car.

The present invention is intended particularly to supply the present need for light, simple and entirely foolproof equipment that can be readily applied to and removed from practically any conventional automobile, so that it may be manufactured at low cost, and rented at a very low price for short term use as above suggested.

In the accompanying drawings the invention is illustrated in a certain preferred form of embodiment that has been thoroughly tested in use and found to be eminently satisfactory and which is here illustrated merely to exemplify the invention and not with any purpose of limiting the scope of the appended claims to any of the particular structure of the preferred embodiment.

In the accompanying drawings, which form part of this application for Letters Patent, Figure 1 is a perspective view of the forward portion of the interior of a conventional automobile body showing the instrument board, floor board and operating controls, with apparatus constructed in accordance with the principles of the present invention applied.

Fig. 2 is a side elevational view of the support member forming part of the new combination, with its supported bracket.

Fig. 3 is a similar view, taken at a right angle to the view of Fig. 2, showing in dotted lines the position of the rock shafts that are carried by the bracket and support member.

Fig. 4 is an enlarged view showing in side elevation an installation in an automobile having a control pedal extending through the floor board.

Fig. 5 is a detailed view of the support member and bracket structure shown in Figs. 1–4 with, however, the bracket arranged to accommodate a different spacing requirement.

Fig. 6 is a view similar to that of Fig. 4 but showing an installation in a car having depending pedal arms.

Fig. 7 is a view similar to that of Fig. 5 but showing a still different arrangement of bracket for accommodating another type of spacing requirement; and Fig. 8 is a detail cross-sectional view taken on the line 8—8 of Fig. 6.

Referring now to these figures, the reference numeral 1 designates the floor of an automobile of any conventional type, which merges in an upwardly inclined toe board 2 connecting the floor with a fire wall 3 separating the engine compartment from the customary instrument panel 4. It will be recognized that all automobiles of current construction, regardless of variations in body style, include substantially this construction.

The steering wheel of the automobile is shown at 5, and the reference numerals 6 and 7 in Fig. 1 designate respectively the brake and clutch pedals which are located adjacent the steering column and are operated by the driver of the vehicle.

It is to these normal operating pedals 6 and 7, or to either one of them if only one be provided, as in the case of automobiles having certain types of automatic drive, that the present invention adds extra or supplemental controls for use by the instructor.

As best appears in Fig. 1, each of the pedals 6 and 7 has connected to it a supplemental control pedal as shown at 8 and 9, respectively. The connection is such that movement of the main and supplemental pedals 7 and 8, or 6 and 9, occurs together, i.e., movement of either the main or supplemental pedal produces movement of the connected pedal and of the brake or clutch mechanism controlled thereby.

The connection is effected through the medium of a rock shaft 10 for the pedals 7 and 8, and a rock shaft 11 for the pedals 6 and 9. The pedals 8 and 9 are directly and rigidly connected each to its rock shaft, as by welding the rod stock together, and the connection of each rock shaft to its pedal 6 or 7 is through the medium of an arm 12 or 13 rigidly secured at one end to the rock shaft and provided at its other end with a coupling assembly as best shown in Figs. 6 and 8. This assembly may comprise a bolt or headed pin 14 projecting from one side of the end portion of the arm and journaling a roller 15 which bears on the upper surface of the pedal arm. A stirrup or equivalent hook 16 extends from the pin 14 and is engaged beneath the pedal, as best shown in Figs. 6 and 8, from which it will be appreciated that movement of the pedal in either direction, up or down, will cause the arm 12 or 13 to swing correspondingly and rock the shaft 10 or 11 to which the arm is connected. Similarly, it will be observed that rocking of the shaft will cause the arm to swing correspondingly and impart movement to the pedal. It follows that movements of the pedals 8 and 9 are transmitted to the pedals 6 and 7, causing each of the connected pedals to move exactly as the other.

Connections of this general kind are old in dual control equipment. The present invention consists particularly in the manner in which and the means by which the shafts are mounted in the automobile. This mounting will now be described.

Each of the shafts extends through and is journaled in a bearing sleeve 17 which is clamped by a U-bolt 18 and spacer block 19 to a yoke-shaped bracket 20 located near each end portion of the shaft, as best shown in Fig. 1. Each leg of the bracket 20 contains a large opening and throughout the aligned openings in the two legs there is passed a support member in the form of a strut designated generally 21. This member comprises two telescopically related elements. In the preferred form of embodiment these elements are a tube 22 and screw 23 carrying a nut 24 bearing against the end of the tube from which the screw projects, as best shown in Fig. 2. The bracket 20 is fixed to the tube 22, at any convenient location along the length of the tube, by means of a pair of pipe clamps 25 which are secured tightly around the tube in engagement with opposite surfaces of the legs of the bracket so as to prevent movement of the bracket along the tube. It will be recognized that adjustability of the clamps lengthwise of the tube makes the device quite independent of vertical space limitations, which of course are different in different makes of automobiles.

The outer ends of the support member 21, comprising one end of the tube 22 and one end of the screw 23, are provided with feet welded to the respective ends of the member 21. Each of these feet is formed to fit a part of the fixed structure of the automobile and hold the supporting member in place when expanded. For this purpose the upper foot 26, shown in the preferred embodiment as welded to the screw 22, comprises a short length of angle iron having its concave surface uppermost for engagement with the edge 27 of the instrument panel 4, and the lower foot 28, shown in the preferred embodiment as being welded to the tube 22, is a similar short length of angle iron, with its convex surface outermost for fitting the angle formed by the meeting edges of the fire wall 3 and the toe board 2, as best shown in Figs. 1 and 6. In order to improve the connection of the foot 28 to the floor of the vehicle, the foot may be provided with short prongs 29 for penetrating the carpet or pad of the floor, or even the floor metal itself.

The two support members 21 are installed by simply turning the nuts 24 down against the ends of the tubes 22 until the feet 26 and 28 are pressed sufficiently against the instrument panel 27 and the floor, respectively, so as to hold the members securely in position.

The ends of the shafts 10 and 11 which protrude slightly from the brackets 18 may be provided with ferrules, pins, collars or the like 31 to prevent axial movement of the shafts.

It will be recognized that the installation is made without the necessity of drilling any holes in any of the vehicle structure and without requiring permanent attachment of any fixtures to the vehicle. It is necessary only to expand the support members 21 into secure position and to connect the arms 12 and 13 to the respective pedals of the vehicle. Removal of the equipment is effected by simply collapsing the members 21 and moving the entire equipment laterally enough to disengage the connections 15, 16 from the pedals 6 and 7.

The embodiment thus far described is for automobiles equipped with pedals of the depending type. Fig. 4 illustrates a modification of the apparatus for installation in a vehicle having pedals which extend up through the floor board. In this form of the apparatus, the support members 21 and the assembly of rock shafts, brackets and supplemental pedals are all the same as those that have been described. The installation differs simply in the use of the type of linkage shown in Fig. 4 for connecting each of the rock shafts to one of the vehicle pedals. This may consist of an arm 35 having one end welded to one of the rock shafts and having its other end pin-connected to an appropriately curved link 36 whose opposite end is pin-connected to a clamp 37 secured to the vehicle pedal 38. It will be evident that movement of the pedal up and down, through the opening 39 in the floor board, will swing the arm 35 by push and pull of the link 36 and thus rock the shaft.

Different vehicles have different spacing requirements, involving different lengths of pedals and different relationships of fire wall, steering column, toe board and the like. In order to accommodate a wide range of different spacing characteristics, the bracket mounting of the present equipment can be installed in a number of different relationships, as shown in Figs. 5, 6 and 7.

These different relationships involve different relative positions of the bracket 20 and the U-bolt 18 and spacer block 19.

Thus, in Fig. 5 the rock shafts are shown positioned at minimum spacing from the support member 21. This is accomplished by placing the shaft bearing sleeves 17 within the bracket, with the spacer block 19 on the outside of the bracket base.

In Fig. 7 the shafts are shown spaced at a maximum distance from the support members. This is accomplished by placing the bearing sleeves on the outside of the bracket, with the spacer block intervening.

An intermediate spacing is shown in Fig. 6, where the bearing sleeves are positioned on the outside of the bracket base, resting on the base and with the filler block inside the base.

These three degrees of spacing enable the equipment to be installed on substantially all stock cars of current and recent construction.

It is believed that the foregoing disclosure of a preferred embodiment of the invention is sufficient to acquaint those skilled in the art with the manner in which the invention can be embodied in apparatus producing all of the advantages and features mentioned at the outset of this specification, to produce dual control equipment of inexpensive manufacture and easy installation and interchanging between vehicles, requiring no special tools or modification of the vehicle. In this connection it is to be understood that the prongs 29 are intended to be made short enough merely to provide and insure good frictional engagement of the feet 28 with the vehicle floor, so that the feet will not slip from position. The prongs need not, and preferably do not, pierce the floor boards. When the equipment is removed, the sole alteration left in the vehicle will be found to be inconspicuous perforations or indentations left in the floor mat by the prongs 29, with perhaps also a slight depression left by the vertex of each of the feet 28 in the rubber or pile of the floor mat, as will be understood, it is believed, from the showing made in Figs. 4 and 6.

The invention is capable of being embodied in other and modified forms, all within the scope and purview of the broader of the appended claims.

I claim:

1. In a dual control device for an automotive vehicle having a control pedal, the combination of a strut member including terminal portions engageable respectively with the floor of the vehicle and with vehicle structure above the floor, a rock shaft carrying adjacent one end portion an operating arm provided with an auxiliary pedal, means for operatively connecting the other end portion of the shaft to said control pedal of the vehicle, and means journaling said shaft horizontally on said strut member comprising a U-shaped bracket having legs secured to the strut member and a flat, straight base portion spaced from the strut member and parallel thereto, a spacer block having a flat, straight surface engaged with the base of the bracket, a U-bolt engaged over the shaft and extending through the spacer block and bracket base, and nuts threaded on the U-bolt holding the U-bolt on the bracket base and clamping the shaft and spacer block thereto.

2. Dual control means for an automotive vehicle having a control pedal, said means comprising a strut member including terminal portions engageable respectively with the floor of an automotive vehicle and with structure above the floor, a rock shaft carrying adjacent one end portion an operating arm provided with an auxiliary pedal, means for operatively connecting the other end portion of the shaft to said control pedal of the vehicle, and means journaling said shaft horizontally on said strut member comprising a U-shaped bracket having legs secured to the strut member and a base spaced therefrom and parallel thereto, a spacer block engaged with one side of the base of the bracket, a U-bolt holding the shaft on the other side of the base of the bracket and extending through the spacer block and base of the bracket, and means holding the U-bolt on the base of the bracket and clamping the shaft and the spacer block thereto.

3. The combination claimed in claim 1 in which the spacer block and shaft are both on the same side of the bracket base.

4. The combination claimed in claim 1 in which the spacer block and shaft are both on the side of the bracket base remote from the strut member.

5. The combination claimed in claim 1 in which the shaft is between the strut member and the bracket base and the spacer block is on the opposite side of the bracket base.

6. The combination claimed in claim 1, including a pair of rock shafts disposed in side by side parallel relation between the U-bolt and the base portion of the bracket.

7. The combination claimed in claim 1, including a sleeve interposed between the U-bolt and the adjacent portion of the shaft.

8. The combination claimed in claim 1, including a pair of rock shafts disposed in side by side parallel relation between the U-bolt and the base portion of the bracket and a sleeve interposed between the U-bolt and the adjacent portion of each shaft.

References Cited in the file of this patent
UNITED STATES PATENTS

| | | |
|---|---|---|
| 1,261,425 | Murphy | Apr. 2, 1918 |
| 1,889,685 | McIntyre | Nov. 29, 1932 |
| 2,301,484 | Wahlberg | Nov. 10, 1942 |
| 2,411,500 | Bradley | Nov. 26, 1946 |
| 2,427,269 | Forssell | Sept. 9, 1947 |
| 2,599,656 | Ostrow | June 10, 1952 |
| 2,602,348 | Wilson | July 8, 1952 |
| 2,694,946 | Vandal | Nov. 23, 1954 |
| 2,707,886 | Lerman | May 10, 1955 |
| 2,720,121 | Holum | Oct. 11, 1955 |

FOREIGN PATENTS

| | | |
|---|---|---|
| 78,891 | Denmark | Feb. 7, 1955 |
| 515,126 | Canada | Aug. 2, 1955 |
| 1,014,643 | France | June 18, 1952 |

OTHER REFERENCES

Publication: AAA New 1953 Dual Controls, 1952.